United States Patent [19]
Telymonde

[11] Patent Number: 5,838,131
[45] Date of Patent: Nov. 17, 1998

[54] FOOT OPERATED CONTROL FOR ELECTRICAL CIRCUITS

[76] Inventor: Timothy D. Telymonde, 75 Manchester Ave., Keyport, N.J. 07735

[21] Appl. No.: 982,961

[22] Filed: Dec. 2, 1997

Related U.S. Application Data

[60] Provisional application No. 60/032,232 Dec. 2, 1996.

[51] Int. Cl.[6] .................................................. G05B 11/01
[52] U.S. Cl. ............................ 318/560; 200/86.5; 318/17
[58] Field of Search ........................... 200/86.5; 318/560, 318/17

[56] References Cited

U.S. PATENT DOCUMENTS

| | | |
|---|---|---|
| 4,277,660 | 7/1981 | Lemmer .................................. 200/86.5 |
| 5,199,763 | 4/1993 | Wilder et al. ....................... 200/86.5 X |

Primary Examiner—Karen Masih
Attorney, Agent, or Firm—Patrick J. Pinto

[57] ABSTRACT

A foot operated control for electrical circuits that includes a foot rest, and at least one switch that is housed and mounted in a recess formed in a selected portion of the foot rest. The foot rest having a selected profile defining a horizontal portion and at least one inclined portion. A pivoting axis is formed at an intersection of the horizontal portion and the inclined portion adjacent thereto. The switch is actuated as and when the foot rest portion is tilted in a selected direction about the pivot axis so that an operator of the switch contacts a supporting surface or floor. The foot control may be configured for controlling multiple distinct circuits by way or a corded or cordless operation. This foot control may include elastomer boots or an elastomeric covered bottom cover for providing environmental protection. Preferably, the foot control includes a safety interlock, for minimizing the accidental actuation of the circuits when an operators foot is not present.

20 Claims, 5 Drawing Sheets

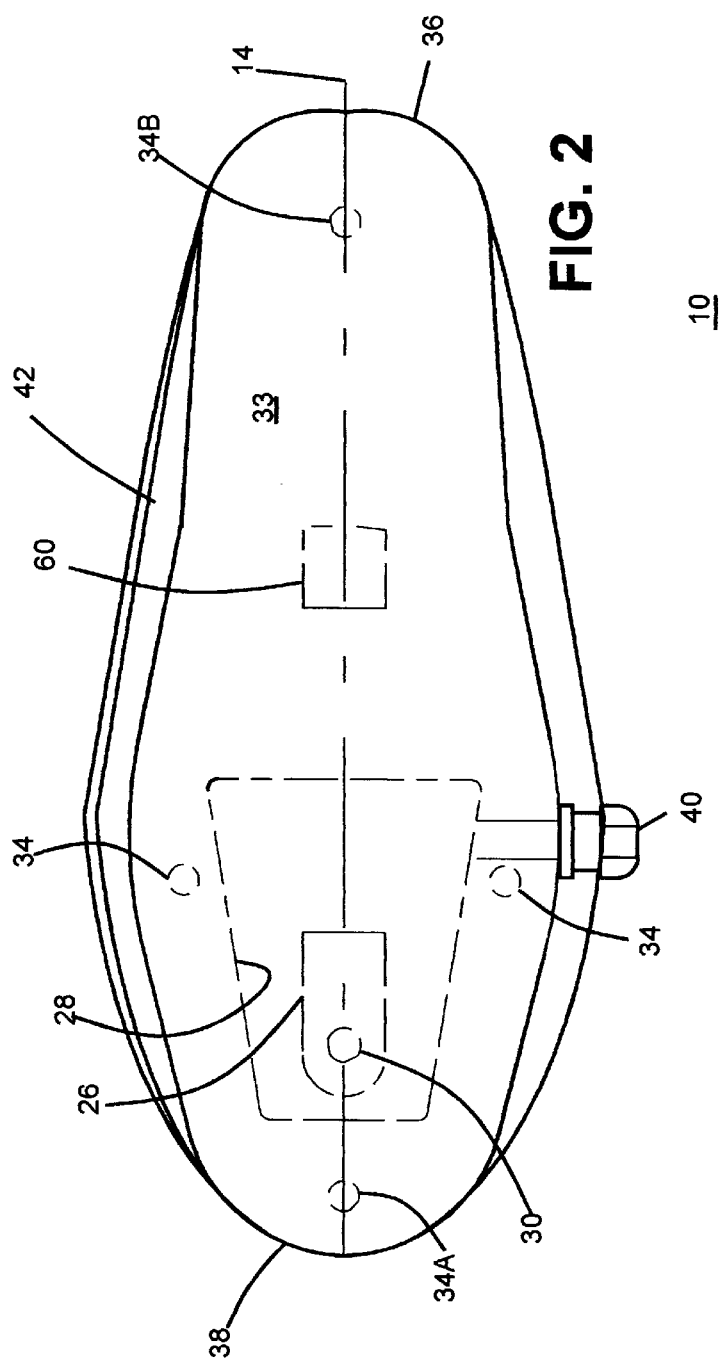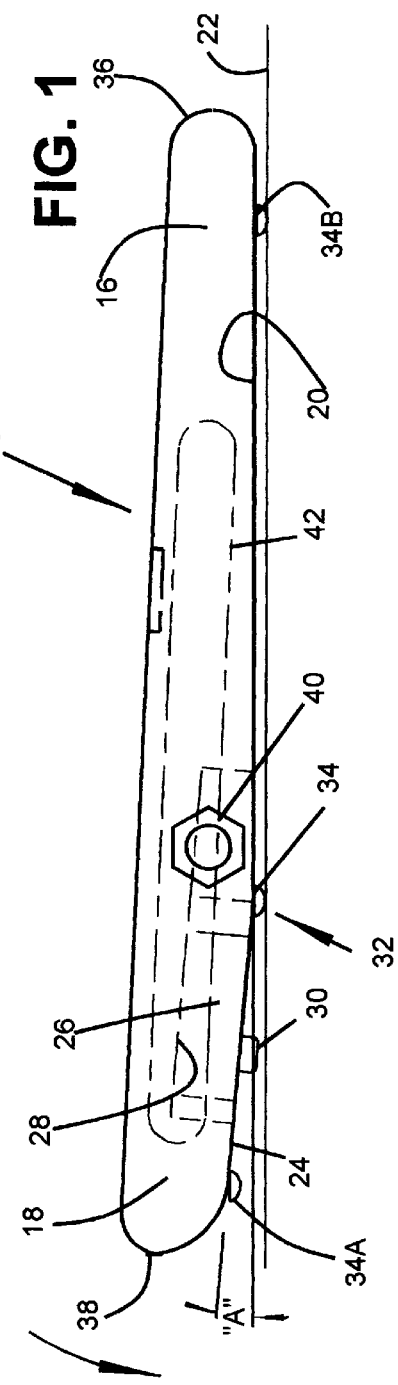

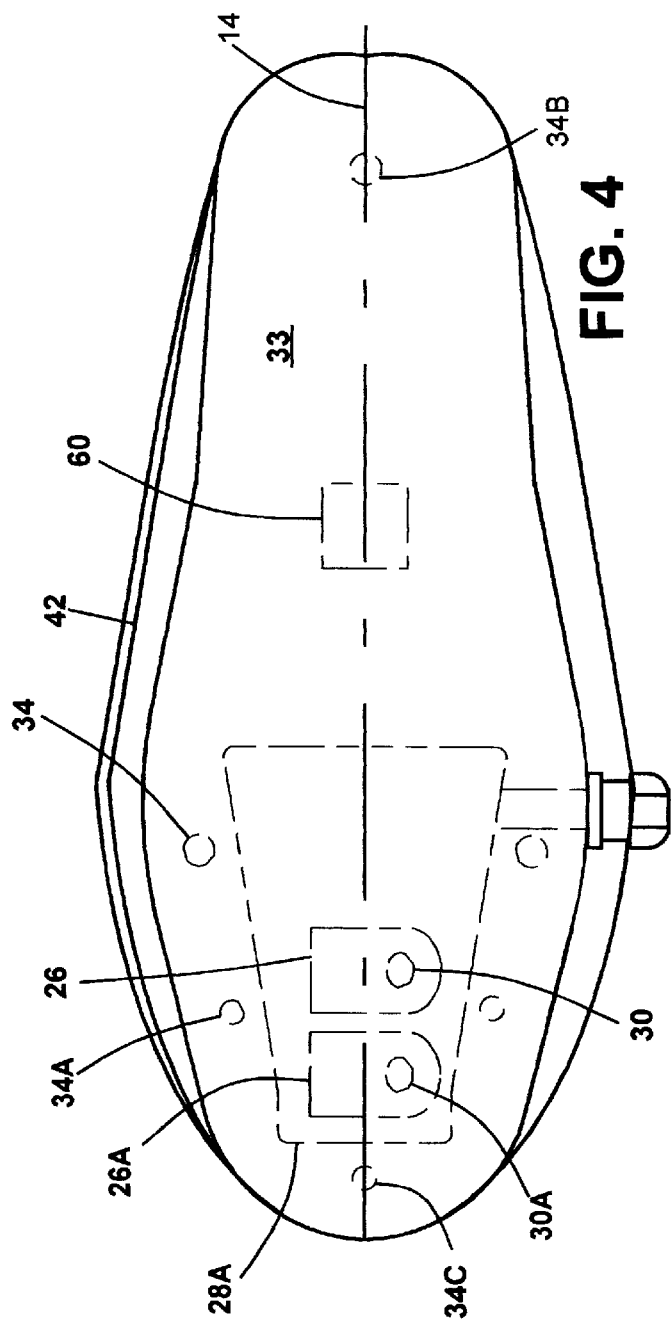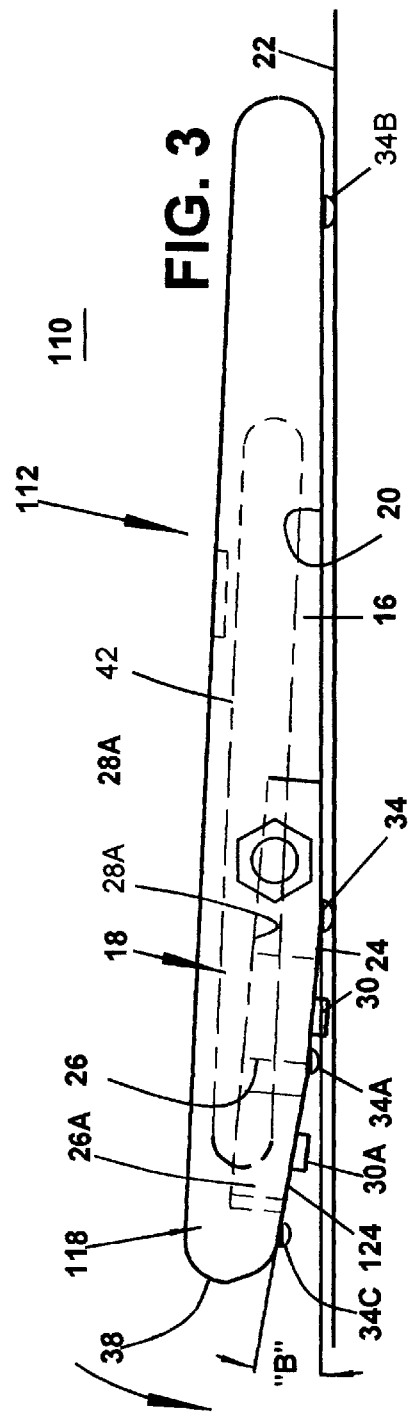

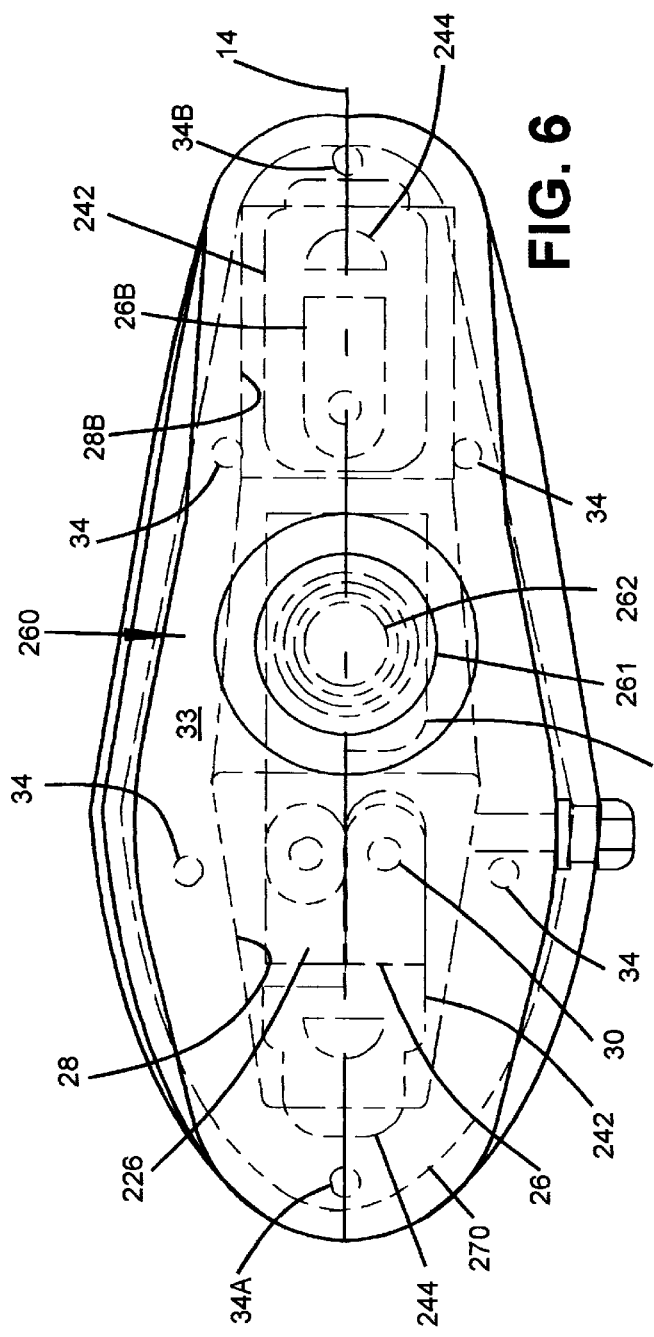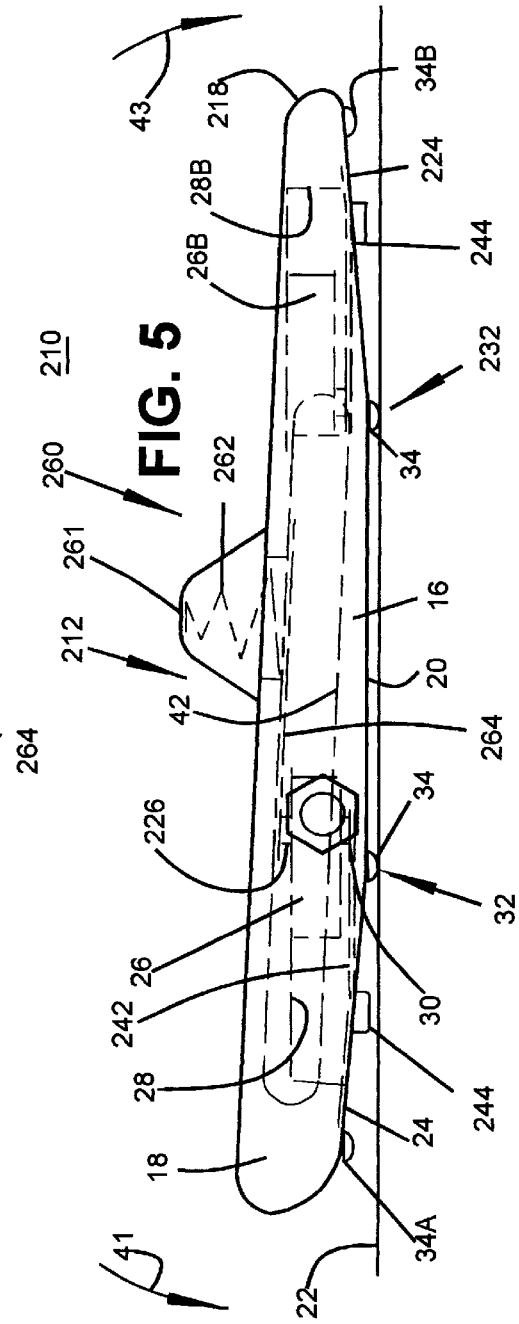

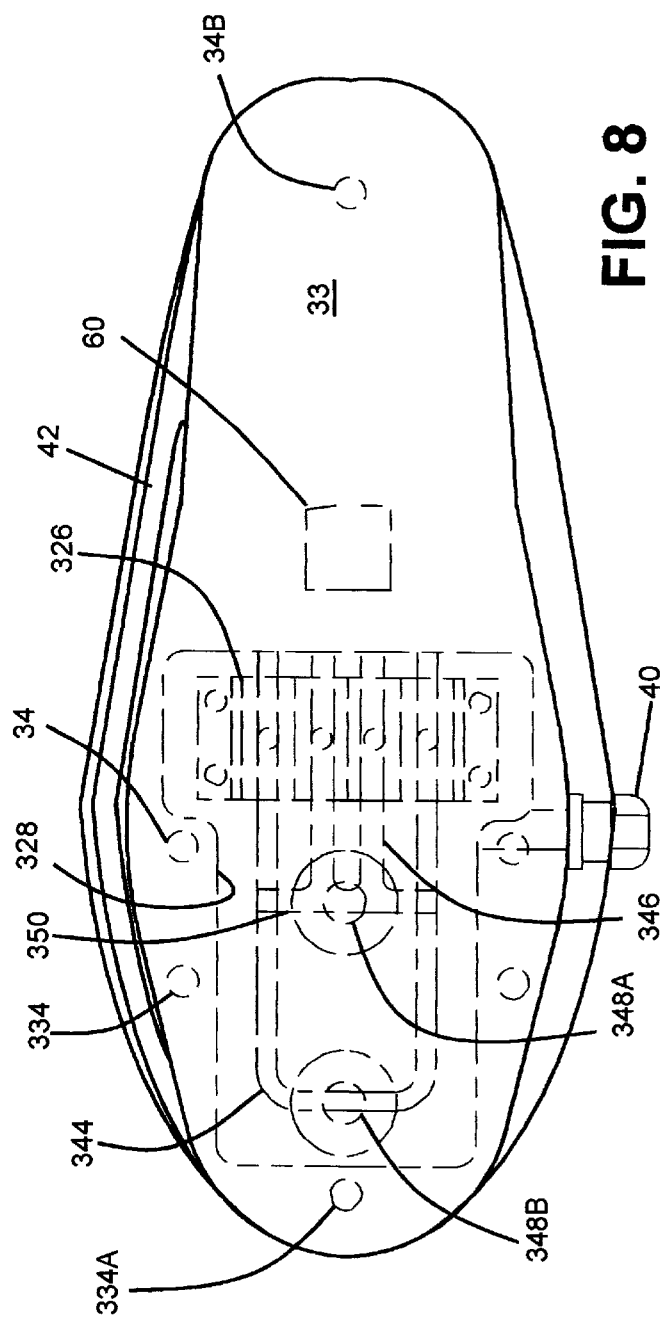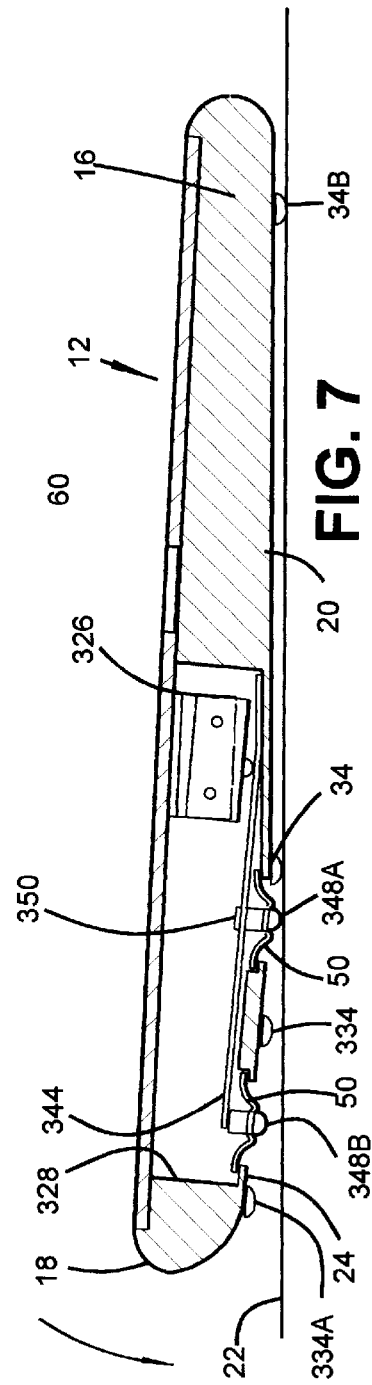

FOOT OPERATED CONTROL FOR ELECTRICAL CIRCUITS

This invention claims the benefit of US Provisional Application No. 60/032,232, filed Dec. 2, 1996.

BACKGROUND OF THE INVENTION

1. Field of the Invention

With regard to the classification of art, this invention is believed to be found in the general class entitled Electricity, Circuit Makers And Breakers and more particularly to those subclasses pertaining to Foot Operated Controls.

2. Description of the Related Art

Foot operated controls for electrical circuits are well know in the art. These foot operated controls are commonly known as foot switches. The known types of commercially available foot switches usually include a base plate, a switch means and a foot pedal that is pivotally attached to the base plate by an axle or pivot pin. Another type of foot switch includes contacts encased in a resilient pad. All of the known types of foot switches require a person or operator to remove the weight of his or her foot off the switch to deactivate the switch. The need to remove the weight of the operators foot from the foot switch pedal places a strain on the operator while performing repetitious tasks in a manufacturing environment. If the operator removes his or her foot completely away from the foot switch, then time may be lost relocating ones foot into the proper operating position.

It has been determined that there is a need for a new type of foot switch or control that allows the operator to rest his or her foot on the switch without causing unwanted activation of an electrical circuit being controlled, It also has been determined that the desired foot control should be ergonomically designed while providing a positive and/or sensory feed back to the operator. The needed foot operated control should also be economical to manufacture.

SUMMARY OF THE INVENTION

The present invention may be briefly described as: A foot operated control for electrical circuits comprising a foot rest, and at least one switch means. The foot rest has at least one longitudinal axis when viewed from its top and a predetermined cross-sectional profile along each longitudinal axis. The cross-sectional profile defining a substantially horizontal portion, and at least one inclined portion. A plane of the underside portion of the horizontal portion being substantially parallel to a supporting surface. Each of the inclined portions being formed with predetermined angle with respect to the underside portion of the horizontal portion. At least one pivot axis is formed on the underside portion of the horizontal portion near a point of transition from the horizontal portion to the inclined portion adjacent thereto. Each pivot axis is formed transverse to its associated longitudinal axis. Each of the switch means being enclosed and seated in at least one recess formed into a selected portion of the foot rest. Each of the recessed switches is actuated as and when an actuator or operator associated therewith comes into contact with the supporting surface by tilting the inclined portion of the foot rest in a selected direction about the selected pivot axis by the operators foot.

In addition to the above summary, the following disclosure is intended to be detailed to insure adequacy and aid in the understanding of the invention. However, this disclosure, showing particular embodiments of the invention, is not intended to describe each new inventive concept that may arise. These specific embodiments have been chosen to show at least one preferred or best mode for a foot control of the present invention. These specific embodiments, as shown in the accompanying drawings, may also include diagrammatic symbols for the purpose of illustration and understanding.

BRIEF DESCRIPTION OF THE DRAWINGS

FIG. 1 represents a front elevation of a first embodiment of the present invention.

FIG. 2 represents a plan view of the first embodiment of FIG. 1.

FIG. 3 represents a front elevation of a second embodiment of the present invention.

FIG. 4 represents a plan view of the second embodiment of FIG. 2.

FIG. 5 represents a front elevation of a third embodiment of the present invention.

FIG. 6 represents a plan view of the third embodiment of FIG. 5.

FIG. 7. represents a front cross-sectional view of a fourth embodiment of the present invention.

FIG. 8 represents a plan view of the fourth embodiment of FIG. 7.

Figure 9:
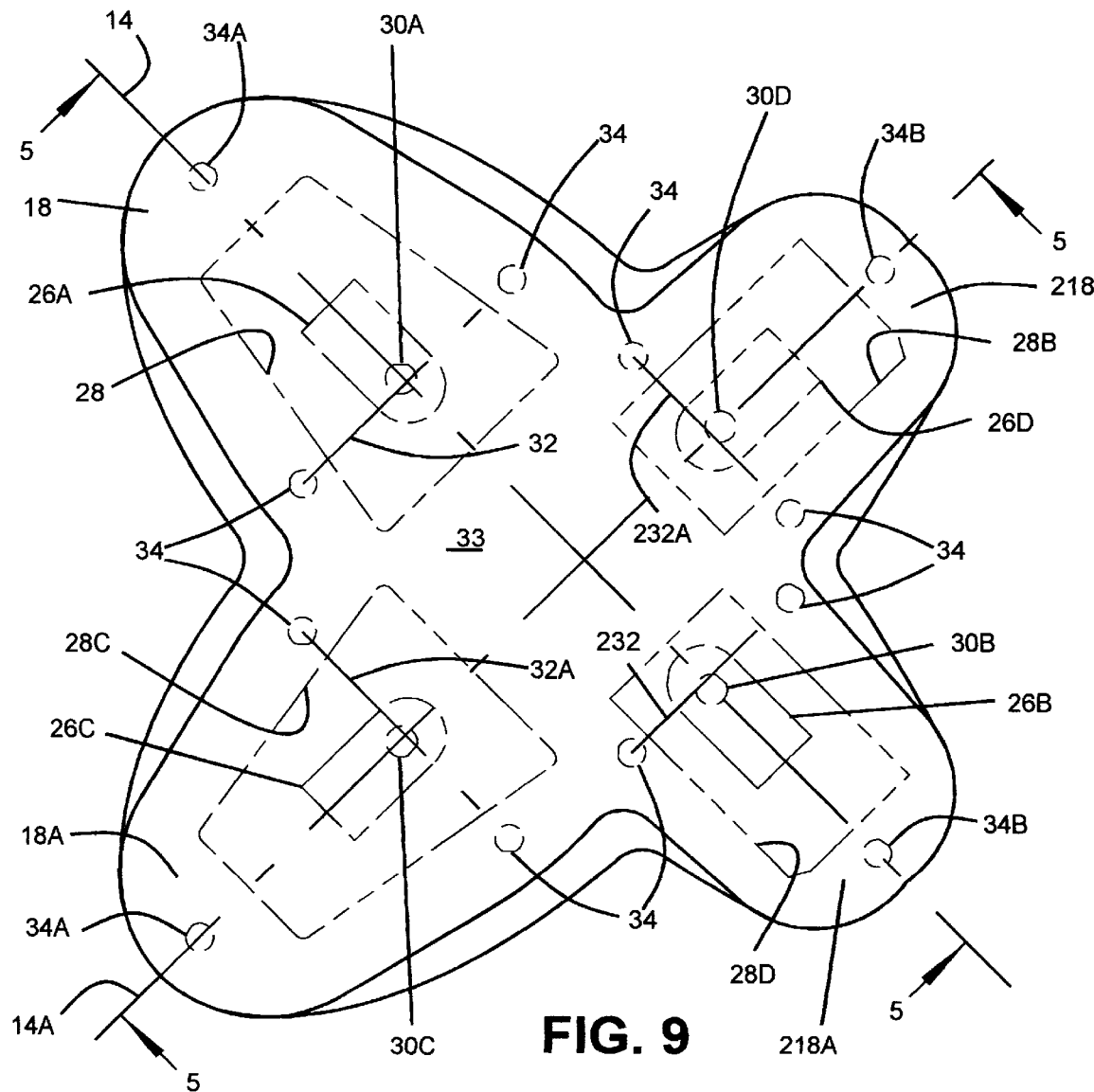
FIG. 9 represents a plan view of a fifth embodiment of the present invention.

In the following description and in the appended claims, various details are identified by specific names for convenience. These names are intended to be generic in their application while differentiating between the various components. The corresponding reference numbers refer to like members throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

EMBODIMENT OF FIGS. 1 AND 2

Referring first to FIGS. 1 and 2, a basic foot control of the present invention is generally identified as 10. This basic foot control 10 includes a foot rest 12 that is preferably formed from a structural material such as a metal or a plastic, but not limited thereto. This foot rest 12 has a longitudinal axis 14, that is more clearly seen in FIG. 2. Referring in particular to FIG. 1, the foot rest 12 is molded, cast or formed to include a horizontal portion 16, and an inclined portion 18. Preferably, an underside portion 20 of the horizontal portion 16 lies in a substantially parallel relationship with a support surface 22, such as a floor, deck and the like. The bottom portion 24 of inclined portion 18 is formed at a predetermined angle with respect to the underside 20. It has been found that a predetermined angle, depicted as "A", between three degrees and sixteen degrees provides the desired operating range. It is preferred that angle "A" be within the range of four and six degrees for minimizing the movement of the operators foot.

A switching means 26 is housed and located interior of a recess 28 that is formed into the underside of the foot rest 12 of the control. It is preferred that the switching means 26 be removably fastened to the foot rest for servicing, as and when required. In this embodiment, a contact surface of an actuator 30 of the switch means extends beyond the plane of the bottom portion 24. This allows the actuator 30 to contact the supporting surface 22 as an when the inclined portion 18 of the foot rest 12 is tilted downward or counterclockwise, in the direction of the arrow, about its pivot axis 32 for switching the contacts of the switch. The tilting action is a selective result of an operators' foot pressure. The pivot axis means 32 may include a pair of hemispherical buttons 34, but not limited thereto. These buttons 34 are spaced at predetermined intervals transverse to the longitudinal axis 14. The buttons 34 may be molded or formed as an integral part of the foot rest 12 or as part of a separate elastomer covered bottom cover that is removable fastened to the foot rest 12. Buttons 34 are used for minimizing the effects of an uneven support surface 22. It is preferred that the top surface 33 provide a substantially flat plane for the users or operators foot to rest upon. It is preferred that surface 33 include a textured surface that is easily cleaned.

It is preferred that additional buttons 34B and 34A be used for protecting the switch means from excessive tilting. 34B is selectively placed on the underside portion 20 near a first end 36. Button 34A, is selectively placed on the bottom portion 24 near an opposite end 38. It is also preferred that all of the buttons be made of a plastic or synthetic material for minimizing any damage to the support surface 22. It is anticipated that these buttons may be mounted to the foot rest 12 in an adjustable fashion for compensating for wear.

EMBODIMENT OF FIG. 3 AND 4

Referring now to FIGS. 3 and 4, a second embodiment of the foot switch is generally identified as 110. This foot switch 110 is similar in construction to foot switch 10, shown in FIGS. 1 and 2. The foot rest 112 includes an additional inclined portion 118 that is formed at the opposite end 38 of the inclined portion 18. It is preferred that a bottom portion 124 of the inclined portion 118 be formed at a predetermined angle "B" with the underside 20 of the horizontal portion 16. Angle "B" is about five degrees greater than Angle "A" but not limited thereto. Angle "A" may be seen in FIG. 1.

This second embodiment includes an additional switching means 26A that is removable housed and mounted in a recess 28A. This second embodiment 110 is adapted for actuation of the second switching means 26A after the first switching means 26 has been actuated. In this second embodiment, the contact elements of the first switch 26 are maintained in a switched condition simultaneously as the contact elements of the second switch 26A are switched. It is preferred that an additional button or buttons 34C be located at or near the free end of the bottom portion 124 for the reasons stated above in connection with switch 10. It is preferred that the top surface 33 of the second embodiment also be similar to the first embodiment.

This second embodiment allows the operator to selectively operate a first circuit by tilting the foot switch partially until a resistance by the first stop 34A is felt, then selectively and subsequently operate the first and second circuits simultaneously by tilting the foot switch 110 completely in the direction of the arrow until button 34C contacts the support surface 22. The switch 26 is actuated when its actuator 30 contacts the supporting surface 22. Switch means 26 and 26A are actuated simultaneously as and when the actuators 30 and 30A are in contact with the supporting surface 22. This type of selective operation is useful in the operation of any apparatus or machine that requires a control or switching means that provides a "dual stage control" or a "ready enable" switching capability and having positive feedback in both switching positions.

EMBODIMENT OF FIGS. 5 AND 6

Referring now to FIGS. 5 and 6, a third embodiment of the present invention is generally identified as 210. In this third embodiment 210, the foot rest 212 includes a horizontal portion 16, an inclined portion 18 and a second inclined portion 218. The second inclined portion 218 is formed at the end of the foot rest 212 that is distal to the inclined portion 18. A switch means 26B is removably housed and mounted into a recess 28B that is formed into the underside of the foot rest 212. Stops or buttons 34B and 34B may be provided for the reasons stated above in connection with embodiment 10.

In this embodiment, a leaf spring 242 is removably fastened to the foot control 310 in cantilever fashion. This cantilever mounting provides for the actuation of switch means 26 as and when a raised portion 244 contacts the support surface 22 by urging the free end of the leaf spring 242 against the actuator 30 of the switch means.

In a deactivated mode, the foot switch 220 rests on pivot axis 32 and 232. The operator may actuate the selected switch and its associated circuit by tilting the foot rest 212 in the direction of arrow 41 or arrow 43. Tilting the foot rest 212 in the direction of arrow 41 until the raised portion 244 contacts the support surface 22 operates only those circuits controlled by the switch 26. Conversely tilting the foot rest 212 in the direction of arrow 43 will only energize the circuit or circuits controlled by switch means 26B.

EMBODIMENTS OF FIGS. 7 AND 8

Referring now to FIGS. 7 and 8, a fourth embodiment of the present invention is generally identified as 310. This fourth embodiment 310 includes a foot rest 12 that is a modified form of the first embodiment 10. This modified form of footrest member 12 includes enlarging the recess 28 in two directions to form a new recess 328. This recess 328 is sized for the mounting and housing of a plurality of switches 326, a U-shaped leaf member 344, and a T-shaped leaf member 346 therein. The plurality of switches 326 may be considered as a gang of switches and is depicted as having four individual operators. One example of the type of switch used is a commercially available basic precision snap action switch, but not limited thereto At least two actuators 348A and 348B are mounted on the underside portion 20 of the foot rest 12. Each of the actuators 348A and 348B are biased outwardly in a direction towards the supporting surface 22. In the example depicted in FIG. 7 and 8, the T-shaped leaf member 346 is mounted in a cantilever fashion so that when its associated actuator 348A pushes upward, the contacts of two center switches are switched. The top bar 350 of the T-shaped leaf member extends over one or more of the legs of the U-shaped leaf 344. The U-shaped leaf member 344 is also mounted in a cantilever fashion so that its legs are adapted to switch the contacts of the outer switches of the gang of switches 326 when urged by its associated actuator 348B.

The example, depicted in FIG. 7 and 8 is adapted for providing control of a plurality of independent electrical circuits. The contacts of the center pair of switches are only switched as the foot switch is tilted by the operator in the direction of the arrow so that stops or buttons 34 and 334 are touching the supporting member. This position allows the actuator 348a to urge the T-shaped leaf member 346 upward in a clockwise direction. The continued tilting of the foot switch in the direction of the arrow so that stops or buttons 334 and 334A are touching the supporting surface simultaneously pushes the actuator 348b inward thereby urging the U-shaped leaf member 344 upward. This upward movement of the U-shaped leaf 344 not only switches the contacts of the outer pair of switches but maintains the switched contact position of the center pair of switches. Maintaining contact of the center pair of switches is accomplished by the legs of the U-shaped leaf 344 urging the top bar 350 upward thereby maintaining the contact. It is to be noted that as few as three switches may be used in a gang and that various switching combinations can be attained by selectively using normally open or normally closed contacts.

While a particular mounting arrangement for the leaf members 344 and 346 has been depicted in FIGS. 7 and 8, it is to be noted that mounting leaf members 344 and 346 from the opposite end, as depicted in FIG. 5 and 6 will also provide the desired actuation of switch, associated therewith, when limited tilting action is required.

It is also to be noted that various shapes and configurations of leaf members may be used to provide actuation of the various combinations of switches for a particular degree of tilting action.

EMBODIMENT OF FIG. 9

A fifth embodiment of the present invention is depicted in FIG. 9. Referring to FIGS. 5, 6, and 9, this fifth embodiment may be identified as a four position foot control having construction similar to the third embodiment. In this fifth embodiment, the plurality of switches 26A; 26B; mounted along axis 14 and the switches 26C; and 26D mounted along axis 14A may be operated separately and independently. The axis 14 and 14A of four position foot control are crossed in the form of an "X". The preferred profile along axis 14 and 14A of the four position foot switch may be more clearly seen in FIG. 5. It is to be noted that single switches 26A 26B; 26C and 26D have been depicted in recesses 28A; 28B; 28C; and 28D in connection with this embodiment. However the ganged switching arrangement shown and disclosed in connection with FIGS. 7 and 8 may be used in their place. The ganged switches may be substituted for any of the switches individually or all of the switches.

Typically the contacts of a switch 26A is selectively actuated by tilting the end 18 of the foot control downward about its pivot axis 32 until its associated operator 30A and button 34A contact a support surface 22. The contacts of switch 26B may be selectively actuated by tilting the end 218 of the downward about its pivot axis 232 until its operator 30B and button 34b contact the support surface 22. The contacts of switch 26C may be selectively actuated by tilting end 18A of the foot control downward about its pivot axis 32A until its associated operator 30C and button 34C contact the support surface 22. The contacts of the switch 26D may be selectively actuated by tilting the end 218A downward about its pivot axis 232A until its associated operator 30D and button 34D contact the support surface.

As previously mentioned the preferred type of switch used in the present invention is a commercially available precision switch. Some examples of the contact configuration for the switches are single pole single throw; single pole double throw, double pole double throw and or double break contact type, but not limited thereto. The double break contact type of switch allows the switch to control circuits from various power sources. If power drain is not a consideration proximity switches, reed switches and the like may be used. It is to be noted that the actuators for the switches should include dust proof and/or waterproof boots or seals 50, shown in FIG. 7, for minimizing environmental damage thereto. Elastomer boots similar to boots 50 may are also used with the all of the embodiments of the present invention. Referring again to FIG. 5 and 6, the raised portions 244 may be integrally molded into and onto the elastomer covering of a removable bottom cover 270 that encloses the bottom of the control 210 in a waterproof manner.

Referring to FIGS. 1 through 4, it is preferred that an electrical interlock switch or means 60 be provided on or under surface 33 for detecting the operators foot thereon. This interlock 60 should and will minimize unwanted activation or deactivation of circuits being controlled by the embodiment of the present invention when a foot is not positioned on surface 33.

Referring particularly to FIG. 5 and 6, an alternative interlock means 260 is shown which includes an elastomer domed boot 261, a compression spring 262, an L-shaped leaf member 264 and a switch means 226. The leaf member 264 is mounted in cantilever fashion to the control so that its free end is adapted to actuate the switch means 226. This alternate interlock means 260 is configured for use in a waterproof environment. This interlock means 260 provides very good response and detection for a wide range of shoes having varying heel heights. The spring 262 compensates for the various arch heights of the shoes while ensuring that the users foot is properly placed on the control.

The foot switch of the present invention may be connected to an apparatus in a corded manner or a cordless manner. In a corded arrangement a length of multi conductor cable is connected to the terminals of the switches. It is preferred that a strain relief fitting 40 be utilized at the point of entry of the cable into any of the embodiments of the foot switch of the present invention.

A cordless or wireless communication means such as an infrared emitter, radio transmitter and the like may be mounted on at least one side of the foot switch. An appropriate cordless or wireless receiver that is tuned to the emitter or transmitter is connected to the apparatus being controlled. One type of infrared emitter and receiver is disclosed in U.S. Pat. No. 5,555,120 that was issued to Telymonde et al. U.S. Pat. No. 5,555,120 is incorporated by reference to the extent the present law allows. This infrared emitter may be mounted in a cavity under at least one window 42, more clearly seen in FIG. 2. The window 42 may be used with any of the embodiments described above. Of course when the foot controls of the present invention are provide in a cordless for, the fitting 40 is not needed.

It is also to be noted that with certain configurations of the control units disclosed above, it may be necessary to provide additional weight in the form of a ballast, such as heavy metal, in the horizontal portion. This additional weight or ballast ensures that control unit returns to a deactivated condition when the operators' foot or the tilting force is removed.

Directional terms such as "front", "back", "in", "out", left, right, downward, upward, bottom and the like may have been used in the description. These terms are applicable to the embodiments shown and described in conjunction with the drawings. These terms may have been merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. A foot operated control for electrical circuits including: a foot rest, and at least one switch means, said foot rest having at least one longitudinal axis and a predetermined cross-sectional profile, said cross-sectional profile defining a substantially horizontal portion, and at least one inclined portion, an underside portion of said horizontal portion being substantially parallel to a supporting surface, said at least one inclined portion being formed with at least one predetermined angle with respect to the horizontal portion, at least one pivot axis being formed on the underside portion of the horizontal portion near the intersection of the horizontal portion and the inclined portion adjacent thereto, each pivot axis being transverse to its associated longitudinal axis, each of said switch means being seated in at least one recess formed into said foot rest, wherein each switch is actuated as and when an actuator associated with said switch comes into contact with said supporting surface by tilting the inclined portion of the foot rest in a selected direction about its associated pivot axis by the foot of an operator.

2. A foot operated control as recited in claim 1 in which the inclined portion includes a first portion defined by a first predetermined angle and a second portion defined by a second predetermined angle that is greater that the first predetermined angle with respect to said underside portion of the horizontal portion, a tilting axis is formed on the bottom portion parallel to said pivot axis near the intersection of the first portion and the second portion adjacent thereto, and wherein said first switch is actuated first by tilting the inclined portion in a selected first direction until the pivot axis and the tilting axis are in contact with the supporting surface, further tilting of the inclined portion in the selected direction so that the pivot axis is not in contact with the supporting surface actuates the second switch while maintaining simultaneous actuation of the first switch.

3. A foot operated control as recited in claim 1 wherein a second of the inclined portions is formed at the first end of the horizontal portion that is distal from the other inclined portion, said second of the inclined portions being formed as a predetermined angle with respect to the horizontal portion, and wherein a second of the switches is mounted in the recess, and wherein said second of the switches is selectively actuated by pivoting the foot rest about a tilting axis near the first end and in a direction opposite to the first direction.

4. A foot operated control as recited in claim 1 wherein at least one of the switches is configured for controlling at least two distinct circuits.

5. A foot operated control as recited in claim 2 wherein at least one of the switches is configured for controlling at least two distinct circuits.

6. A foot operated control as recited in claim 3 wherein at least one of the switches is configured for controlling at least two distinct circuits.

7. A foot operated control as recited in claim 1 where said pivot axis is formed by two resilient shaped button members that are positioned in a spaced relationship.

8. A foot operated control as recited in claim 2 where said pivot axis is formed by a first pair of shaped button members that are positioned in a predetermined spaced relationship, and said tilting axis is formed by a second pair of the shaped button members that are positioned in a predetermined space relationship.

9. A foot operated control as recited in claim 3 where said pivot axis is formed by a first pair of shaped button members that are positioned in a predetermined spaced relationship, and said tilting axis is formed by a second pair of the shaped button member that are positioned in a predetermined space relationship.

10. A foot operated control as recited in claim 1 wherein each switch is sealed by an elastomer cover member for protecting each switch from dust and moisture.

11. A foot operated control as recited in claim 2 wherein each switch is sealed by an elastomer cover member for protecting each switch from dust and moisture.

12. A foot operated control as recited in claim 3 wherein each switch is sealed by an elastomer cover member for protecting each switch from dust and moisture.

13. A foot operated control as recited in claim 1 wherein said foot rest portion includes a cavity formed along one of its sides for housing an infrared emitter, said infrared emitter for providing a cordless communication with an infrared receiver connected to the electric circuit to be controlled.

14. A foot operated control as recited in claim 2 wherein said foot rest portion includes a cavity formed along at least one of its sides for housing an infrared emitter, said infrared emitter for providing a cordless communication with an infrared receiver connected to the electric circuit to be controlled.

15. A foot operated control as recited in claim 3 wherein said foot rest portion includes a cavity formed along at least one of its sides for housing an infrared emitter, said infrared emitter for providing a cordless communication with an infrared receiver connected to the electric circuit to be controlled.

16. A foot operated control as recited in claim 7 wherein said foot rest portion includes a cavity formed along at least one of its sides for housing an infrared emitter, said infrared emitter for providing a cordless communication with an infrared receiver connected to the electric circuit to be controlled.

17. A foot operated control as recited in claim 16 wherein each switch is sealed by an elastomer cover member for protecting each switch from dust and moisture.

18. A foot operated control as recited in claim 1 which includes an interlock mean for detecting the presence of an operators foot on a selected surface.

19. A foot operated control as recited in claim 18 in which the interlock means includes a shaped elastomer member that is arrayed for compensating for various heel heights of a shoe of the operator.

20. A foot operated control as recited in claim 1 which further includes a T-shaped leaf member, and a U-shaped leaf member, the T-shaped leaf member and the U-shaped leaf member being mounted in cantilever fashion from a selected portion of the foot rest, the T-shaped leaf member being configured for switching contacts of at least a first of the switch means, the U-shaped leaf member being adapted for switching contacts of an additional pair of the switch means, each of the switch means being arrayed in a ganged alignment. A top bar of the T-shaped leaf member extends over at least one leg member of the U-shaped leaf member, and wherein a first actuating means urges the T-shaped leaf member thereby switching the contacts of at least the first of the switch means during the tilting of the foot rest in the selected direction to a first angle of motion, and a second actuator means urges the U-shaped leaf member thereby switching the contacts of the second pair of switch means during a further tilting of the foot rest in the selected direction to a second angle of motion, the top bar of the T-shaped leaf member and the U-shaped leaf member cooperating for maintaining the switched condition of the first of the switch means during the tilting to the second angle of motion.

* * * * *